United States Patent Office.

CARL SCHEIBLER, OF BERLIN, GERMANY.

PROCESS OF OBTAINING SUGAR FROM PLANT-JUICES.

SPECIFICATION forming part of Letters Patent No. 260,327, dated June 27, 1882.

Application filed March 3, 1882. (No specimens.) Patented in Belgium January 26, 1882, No. 56,900; in France January 26, 1882, No. 147,070; in Great Britain January 26, 1882, No. 398; in Austria-Hungary March 7, 1882, Nos. 8,315 and 2,997, and in Luxemburg March 13, 1882, No. 190.

*To all whom it may concern:*

Be it known that I, CARL SCHEIBLER, doctor of philosophy, subject of the King of Prussia, residing at Berlin, Prussia, German Empire, have invented certain new and useful improvements in the process of obtaining sugar out of the juices of plants; and I do hereby declare the following to be a full, clear, and exact description of the invention, such as will enable others skilled in the art to which it appertains to make and use the same.

In my application for patent for improvements in the manufacture of sugar from molasses or sirup, filed on or about February 23, I have stated that the saccharate of strontium may be employed for the separation of beet or other saccharine juices. This present invention is based upon the said application or process and upon later experiments and discoveries relating thereto. According to the aforesaid application I obtain the strontium saccharate at boiling heat as a dense, and with difficulty soluble, precipitate which at low temperature separates into a crystallizing strontium hydroxide $Sr(OH)_2 + 8H_2O$, and a sugar solution saturated with strontium hydroxide.

For the separation (purification) of the beet-juices or other saccharine vegetable juices the undissolved (by boiling heat separated) strontium saccharate may be directly applied, as well as the sugar-strontium solution obtained therefrom, and while cooling chemically separated from cystallized strontium hydroxide. The beet-juices and also the juices of other sugar-containing plants or fruits contain besides the sugar a large number of organic and inorganic constituent parts, which may be called by the general name of "non-sugary" materials. These have to a great extent to be removed from the juices before a successful production can take place. At present these materials are very generally separated from the juices by boiling with caustic lime. In this operation a considerable number of inorganic and organic non-sugary materials (such as sulphuric acid, phosphoric acid, oxalic acid, citric acid, and pectine) combine with the lime into a precipitate wherewith the albuminous (in the boiling heat coagulated) materials unite into a slimy mass. These slimy parts are then removed from the separated sugar-solution by means of a filter-press or otherwise. This separating operation may, however, be accomplished in a much more perfect manner by the application of caustic strontium instead of lime. The separation by strontium alone is much more perfect than by caustic lime, because the strontian precipitates are much more insoluble than those of the lime, and because the strontian precipitates a certain number of non-sugary materials which are not removed by a lime separation. Hence the quotient or percentage of purity of the sugar-juices separated by strontian is very materially higher than that of the juices separated by lime. The juices from the strontian separation are, even immediately after the saturation, perceptibly purer than those resulting from the lime separation after their animal-charcoal filtration, so that this latter costly filtration may be dispensed with by the introduction of the strontian separation. Thus the long-desired problem of manufacturing raw sugar without the animal-charcoal filtration has been solved.

The above-mentioned advantages accompanying the separation of beet-juices by means of strontian are very materially enhanced when the separation is effected, not by strontian alone, but by strontian saccharates, because the latter contain the sugar in a high degree of purity, and this pure sugar enters into the separated beet-juices. The quotient of purity is thus very materially increased.

The separation of the beet-juice or other vegetable juices may be effected either by simple boiling, similarly to the old mode of separation, with subsequent carbonic acid saturation, or by boiling with simultaneous introduction of carbonic acid.

When separating with simultaneous saturation the carbonic acid may be also introduced to a limited extent only, whereby the juice retains a strong strontian alkali reaction which is only removed after the removal of the slime by a second or a subsidiary saturation, or other similar methods may be employed.

For the purpose of separation the strontium saccharate, which is available in solid form, is introduced into the heated beet or other vegetable juice while stirring, whereby it is dissolved; or else I may use the sugar strontian solution which is separated from the solid saccharate by cooling and separated from the strontian crystals. Obviously more must be used of the latter material, as it contains less strontian than the solid saccharate originally obtained from molasses or sirup.

The strontian slime of separation, including the slime of saturation, contains, besides coagulated albuminous materials, all the inorganic and organic non-sugary materials precipitated from the beet or plant juices, and also carbonate of strontium. After this has been removed from the juices it has to be specially treated in order to recover from it the strontian contained therein. This treatment consists in molding the carbonate of strontium at once or after drying it (and with or without admixtures, such as sawdust, coal-dust or smalls, tar, or the like) into bricks or pieces, which are dried and then glowed in a furnace; or the dried slime may first undergo a dry-retort distillation for the purpose of obtaining ammoniac-tar and combustible gases for heating and lighting purposes. In that case the residue in the retort is first, together with the said admixture—such as sawdust—formed into bricks and glowed.

The organic acid, the albumen, pectine, and the like, as well as the admixtures, if any, burn away in the glowing, and the so-produced carbonate of strontium is by the further burning transformed into caustic strontium. The always small quantity of sulphate of strontium contained is transformed into sulphide of strontium, which separates by the subsequent solution, as is well known, and gives off its sulphur to the iron and manganese and other substances contained in the beet-juice and the admixtures, if used. The phosphoric acid in the slime, and which proceeded from beet or plant juice, is still contained in the burned masses in the form of phosphate of strontium. The same is the case with the traces of silicic acid.

The slaking and manipulation of the caustic burned strontian slime of separation is done exactly in the manner I have minutely described in the *Neue Zeitschrift fur Rübenzucker-Industrie*, volume 8, page 8, chapter 8. Hereby is obtained crystallized strontium hydroxide, $Sr(OH)_2 + 8H_2O$, and also an undissolved remainder, which mainly consists of untransformed $SrCO_2$, and besides contains the aforesaid constituent parts, such as phosphate of strontium, iron, and manganese. I shall presently return to the further treatment of this remainder.

The strontian crystals, $Sr(OH)_2 + 8H_2O$, are used again for separation of sugar from molasses, as described in the specification of my above-mentioned application for patent. The saccharate thus obtained is then, as aforesaid, utilized again for the separation of beet or other plant juices, and so on.

It yet remains to mention the treatment of the aforesaid remainders from the slaking of the caustic burned slime of separation. These remainders are collected and periodically specially treated. They contain, as stated, besides iron, manganese, and the like, also carbonate of strontium and phosphate of strontium. This latter constituent part has to be transformed into carbonate of strontium. This is done by well boiling the remainders (which have been kept damp) with a solution of carbonate of potash or soda, (in the best and cheapest manner with an extract of dry ashes of beet-root—*schlempenkohle*,) or with the ammoniacal waters from gas-manufacture, or even with the saturated non-sugary lye resulting from the separation of saccharate from molasses. The greatest part of the phosporic acid in the phosphate of strontium then combines with potash, soda, or ammonia, while the strontian is transformed into carbonate of strontium. After this treatment of the remainders they are washed and, with the aforesaid admixtures, formed into bricks, which, in contradistinction to the aforesaid bricks, may be called "secondary" bricks or "remainder" bricks. These latter are separated from the former, placed in furnaces, and fired, so as to become transformed into caustic strontium, which, by slaking and loosening, produces crystals of $Sr(OH)_2 + 8H_2O$. The remainder from this operation may, if required, be treated once more in the same manner, or else be thrown away.

By the above-described mode of treating beet and other plant juices the entire amount of sugar therein is obtained in a crystalline form, the juices being separated into sugar and into non-sugary materials. The sugar obtained has a remarkably pure taste. Molasses is only produced as in a temporary or passing stage, and the sugar therein at once returns into the cycle of treatments. The amount of strontian required for forming the saccharate set free by the cooling from the molasses available in a factory is just sufficient for separating the amount of beet-juices of the same factory. Molasses is in this process not a product for sale or other use. Thus the long-desired process of sugar-production from beet, without production of molasses, has been invented.

The advantages of the above-described mode of manufacture are the following:

*a*. Entire gain of all the beet-sugar in the form of filling masses possessing a very high quotient of purity.

*b*. Excellent taste of the sugar obtained, reminding of that of the cane-sugar.

*c*. Doing away with the expensive animal-charcoal filtration of the separated juices, or material diminution of this stage.

*d*. Obtaining ammoniac-tar and combustible gases by dry distillation of the strontium slime of separation.

*e*. Saving all the non-sugary parts of the beet, including the phosphoric acid extracted from the strontian slime, and the realization of same as manure.

I claim substantially as hereinbefore set forth—

1. The application of caustic strontium for the separation or purification of the juices of beet-root and other sugar-containing plants.

2. The application of the saccharates of strontium, either the solid saccharate obtained at boiling-heat or the soluble saccharate obtained at the cooling after the removal of the crystallized hydroxide of strontium, for the separation or purification of the juices of beet-root and other sugar-containing plants.

3. The mode of transforming the strontian contained in the obtained slime of separation and saturation into caustic strontium—viz., by forming this slime, with or without admixture of reducing and binding materials, into compact pieces or bricks, which are dried and fired.

4. The mode of treating the parts which remain over in the water after the slaking or solution of the pieces named in the preceding or third claim—viz., with fixed alkali carbonates, with ammoniacal liquors, or with non-sugary dry ashes of beet-root—for the purpose of transforming the phosphate of strontium contained in the said remainders into carbonate of strontium.

5. The dry distillation of the strontian-containing slimes of separation and saturation before their transformation into caustic strontium described in claim 3, for the purpose of obtaining ammoniac-tar, combustible gases, and other products.

In testimony whereof I affix my signature in presence of two witnesses.

CARL SCHEIBLER.

Witnesses:
G. LOUBIER,
B. ROI.